(12) United States Patent
Lim et al.

(10) Patent No.: US 10,482,609 B2
(45) Date of Patent: Nov. 19, 2019

(54) OPTICAL FLOW DETERMINATION SYSTEM

(71) Applicant: General Electric Company, Schenectady, NY (US)

(72) Inventors: Ser Nam Lim, Schenectady, NY (US); Mustafa Devrim Kaba, Niskayuna, NY (US); Mustafa Uzunbas, Niskayuna, OH (US); David Diwinsky, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 302 days.

(21) Appl. No.: 15/478,784

(22) Filed: Apr. 4, 2017

(65) Prior Publication Data
US 2018/0286055 A1 Oct. 4, 2018

(51) Int. Cl.
| G06T 7/215 | (2017.01) |
| G06N 3/04 | (2006.01) |
| G06N 3/08 | (2006.01) |
| G06T 7/277 | (2017.01) |

(52) U.S. Cl.
CPC ........... *G06T 7/215* (2017.01); *G06N 3/0454* (2013.01); *G06N 3/084* (2013.01); *G06T 7/277* (2017.01); *G06T 2207/20084* (2013.01)

(58) Field of Classification Search
CPC ........... G06T 7/215; G06T 7/277; G06T 7/20; G06T 7/579; G06T 2207/20084; G06T 2207/30241; G06N 3/0454; G06N 3/084
See application file for complete search history.

(56) References Cited

U.S. PATENT DOCUMENTS

| 5,590,218 A | 12/1996 | Ornstein |
| 5,680,487 A | 10/1997 | Markandey |
| 6,628,715 B1 | 9/2003 | Iu et al. |
| 8,958,641 B2 | 2/2015 | Yagi et al. |
| 9,159,137 B2 | 10/2015 | Huang et al. |
| 9,536,147 B2 | 1/2017 | Yan |

(Continued)

FOREIGN PATENT DOCUMENTS

WO 2016132150 A1 8/2016

OTHER PUBLICATIONS

Mathieu, Michael, Camille Couprie, and Yann LeCun. "Deep multi-scale video prediction beyond mean square error." arXiv preprint arXiv:1511.05440 (2015). (Year: 2015).*

(Continued)

*Primary Examiner* — Carol Wang
(74) *Attorney, Agent, or Firm* — Christopher R. Carroll; The Small Patent Law Group LLC

(57) ABSTRACT

A generative adversarial network (GAN) system includes a generator sub-network configured to examine images of an object moving relative to a viewer of the object. The generator sub-network also is configured to generate one or more distribution-based images based on the images that were examined. The system also includes a discriminator sub-network configured to examine the one or more distribution-based images to determine whether the one or more distribution-based images accurately represent the object. A predicted optical flow of the object is represented by relative movement of the object as shown in the one or more distribution-based images.

18 Claims, 4 Drawing Sheets

(56) References Cited

U.S. PATENT DOCUMENTS

| | | | |
|---|---|---|---|
| 2003/0213892 | A1 | 11/2003 | Zhao et al. |
| 2006/0020562 | A1 | 1/2006 | Murali |
| 2017/0195561 | A1* | 7/2017 | Hegelich ............ H04N 5/23238 |
| 2017/0365038 | A1* | 12/2017 | Denton ..................... G06T 5/00 |
| 2018/0137389 | A1* | 5/2018 | Mathieu ............. G06K 9/00718 |
| 2018/0234671 | A1* | 8/2018 | Yang ......................... G06T 7/70 |
| 2018/0349526 | A1* | 12/2018 | Atsmon .............. G06F 17/5009 |

OTHER PUBLICATIONS

Anderson, Alexander G., Cory P. Berg, Daniel P. Mossing, and Bruno A. Olshausen. "Deepmovie: Using optical flow and deep neural networks to stylize movies." arXiv preprint arXiv:1605.08153 (2016). (Year: 2016).*

Walker, Jacob, Abhinav Gupta, and Martial Hebert. "Dense optical flow prediction from a static image." In Proceedings of the IEEE International Conference on Computer Vision, pp. 2443-2451. 2015. (Year: 2015).*

Dosovitskiy, Alexey, et al. "Flownet: Learning optical flow with convolutional networks." In Proceedings of the IEEE international conference on computer vision, pp. 2758-2766. 2015. (Year: 2015).*

Xiao, Ted, Raul Puri, and Gautham Kesineni. "Frame Rate Upscaling with Deep Neural Networks." Term Paper for CS294-129 Deep Neural Networks, Fall 2016 (Year: 2016).*

Vondrick, Carl, Hamed Pirsiavash, and Antonio Torralba. "Generating videos with scene dynamics." In Advances in Neural Information Processing Systems, pp. 613-621. 2016. (Year: 2016).*

Tulyakov, Sergey, Ming-Yu Liu, Xiaodong Yang, and Jan Kautz. "MoCoGAN: Decomposing Motion and Content for Video Generation." arXiv preprint arXiv:1707.04993 (2017). (Year: 2017).*

Ravanbakhsh, Mandyar, Moin Nabi, Hossein Mousavi, Enver Sangineto, and Nicu Sebe. "Plug-and-Play CNN for Crowd Motion Analysis: An Application in Abnormal Event Detection." arXiv preprint arXiv:1610.00307 (2016). (Year: 2016).*

Souly, Nasim, Concetto Spampinato, and Mubarak Shah. "Semi and weakly supervised semantic segmentation using generative adversarial network." arXiv preprint arXiv:1703.09695 (2017). (Year: 2017).*

Alletto, Stefano, and Luca Rigazio. "Unsupervised Motion Flow estimation by Generative Adversarial Networks." (2017). (Year: 2017).*

Wang et al., "Generative Image Modeling Using Style and Structure Adversarial Networks", Computer Vision—ECCV 2016, vol. 9908, pp. 318-335, Sep. 17, 2016.

Nielsen; "Using Neural Nets to Recognize Handwritten Digits" http://neuralnetworksanddeeplearning.com/chap1.html 2, Neural Networks and Deep Learning, Jan. 2017, 54 Pages.

Long; Shelhamer; Darrell; "Fully Convolutional Networks for Semantic Segmentation", UC Berkeley, The IEEE Conference on Computer Vision and Pattern Recognition (CVPR), 2015, 10 Pages.

Li; Karpathy; "CS231n Convolutional Neural Networks for Visual Recognition", http://cs231n.github.io/neural-networks-1/, 2015, 15 pages.

Karpathy; "CS231n Convolutional Neural Networks for Visual Recognition, Convolutional Neural Networks (CNNs / ConvNets)" http://cs231n.github.io/convolutional-networks/, 26 pages.

Goodfellow; Pouget-Abadle; Mirza, Xu, Warde-Farley; Ozair; Courville; Benglo; "Generative Adversarial Nets", D'epartement d'informatique et de recherche op'erationnelle Universit'e de Montr'eal Montr'eal, QC H3C 3J7, Jun. 10, 2014, 9 pages.

Canadian Office Action for corresponding CA Application No. 2,998,937 dated Jan. 4, 2019 (4 pages).

Extended European Search Report for Corresponding EP Application No. 18165671.1-1210 dated Jun. 14, 2018 (7 pages).

Zhou "et al. Learning Temporal Transformations from Time-Lapse Videos" European Conference on Computer Vision; 2016 (16 pages).

Ioffe et al "Batch Normalization: Accelerating Deep Network Training Reducing Internal Covariate Shift" arXiv:1502.03167v3; 2015 (11 pages).

* cited by examiner

OPTICAL FLOW DETERMINATION SYSTEM

FIELD

The subject matter described herein relates to image analysis systems that use one or more neural networks.

BACKGROUND

Neural networks can be used to analyze images for a variety of purposes. For example, some neural networks can examine images to identify objects depicted in the images. Some sets of images are or can represent frames of a video showing relative movement between an object depicted in the images and a viewer of the images. Optical flow describes this relative motion of the objects with respect to the observer in a visual scene. Accurate and effective calculation of optical flow can be used in various computer vision applications, such as object detection, tracking, movement detection, robot navigation, three-dimensional (3D) reconstruction and segmentation, etc.

But, accurate and effective calculation of optical flow can be difficult to achieve. This calculation amounts to finding pixel correspondences between consecutive frames, which is a time-consuming task. At times, there is no exact pixel intensity correspondence, or the solution is not unique, which frustrates or prevents determination of the optical flow.

BRIEF DESCRIPTION

In one embodiment, a generative adversarial network (GAN) system includes a generator sub-network configured to examine images of an object moving relative to a viewer of the object. The generator sub-network also is configured to generate one or more distribution-based images based on the images that were examined. The system also includes a discriminator sub-network configured to examine the one or more distribution-based images to determine whether the one or more distribution-based images accurately represent the object. A predicted optical flow of the object is represented by relative movement of the object as shown in the one or more distribution-based images.

In one embodiment, a method includes examining images of an object moving relative to a viewer of the object using a generator sub-network of a generative adversarial network (GAN) system, generating one or more distribution-based images using the generator sub-network based on the images that were examined by the generator sub-network, examining the one or more distribution-based images using a discriminator sub-network of the GAN system to determine whether the one or more distribution-based images accurately represent the object, determining a predicted optical flow of the object based on the one or more distribution-based images responsive to determining that the one or more distribution-based images accurately represent the object using the discriminator sub-network.

In one embodiment, a system includes a generator sub-network configured to examine images of a moving object. The generator sub-network also is configured to generate one or more distribution-based images based on distributions of pixel characteristics in the images. The system also includes a discriminator sub-network configured to examine the one or more distribution-based images to determine one or more errors between the one or more distribution-based images and the images of the moving object. The one or more errors are indicative of whether the one or more distribution-based images accurately represent the moving object. A predicted optical flow of the object is represented by relative movement of the object as shown in the one or more distribution-based images.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide optical flow determination systems and methods that determine the optical flow of objects in frames or images. The optical flow of an object describes, represents, or indicates the relative motion of the object with respect to an observer of the object in a visual scene. In one example, the optical flow determination systems and methods include or use a generative adversarial network (GAN) to determine optical flows of objects from two or more images.

The GAN includes two sub-networks, namely a generator sub-network and a discriminator sub-network. These sub-networks interact in a setting of a two-player minimax game. During training, the generator sub-network attempts to learn how to produce real-looking image samples based on training images provided to the generator sub-network. The discriminator sub-network attempts to learn how to distinguish the produced image samples from the genuine (e.g., training) image samples, which are original and not produced by the generator sub-network. These sub-networks can eventually converge to an equilibrium point where the generator sub-network produces image samples which are indistinguishable (from the perspective of the discriminator sub-network) from the genuine image samples. The GAN is used to learn how to estimate the optical flow between consecutive video frames. An unsupervised learning scheme is used, where no ground truth for optical flow is needed to estimate optical flow. The ground truth can be a multi-channel image which encodes the optical flow for each pixel of another set of video frames. The system and method learns learn to estimate the optical flow by just considering consecutive video frames.

Artificial neural networks such as GANs include artificial neurons, or nodes, that receive input images and perform operations (e.g., functions) on the images, selectively passing the results on to other neurons. Weight values are associated with each vector and neuron in the network, and these values constrain how input images are related to outputs of the neurons. Weight values can be determined by the iterative flow of training data through the network. For example, weight values are established during a training phase in which the network learns how to identify particular object classes by typical input data characteristics of the objects in training or ground truth images.

At least one technical effect of the systems and methods described herein includes the determination or prediction of optical flow in images of one or more objects, where the optical flow that is determined or predicted is used to generate 3D point cloud image sets that are used to inspect the interior of equipment (e.g., turbine engines) for determining and initiating repair of the equipment without taking the equipment out of service.

Figure 1:
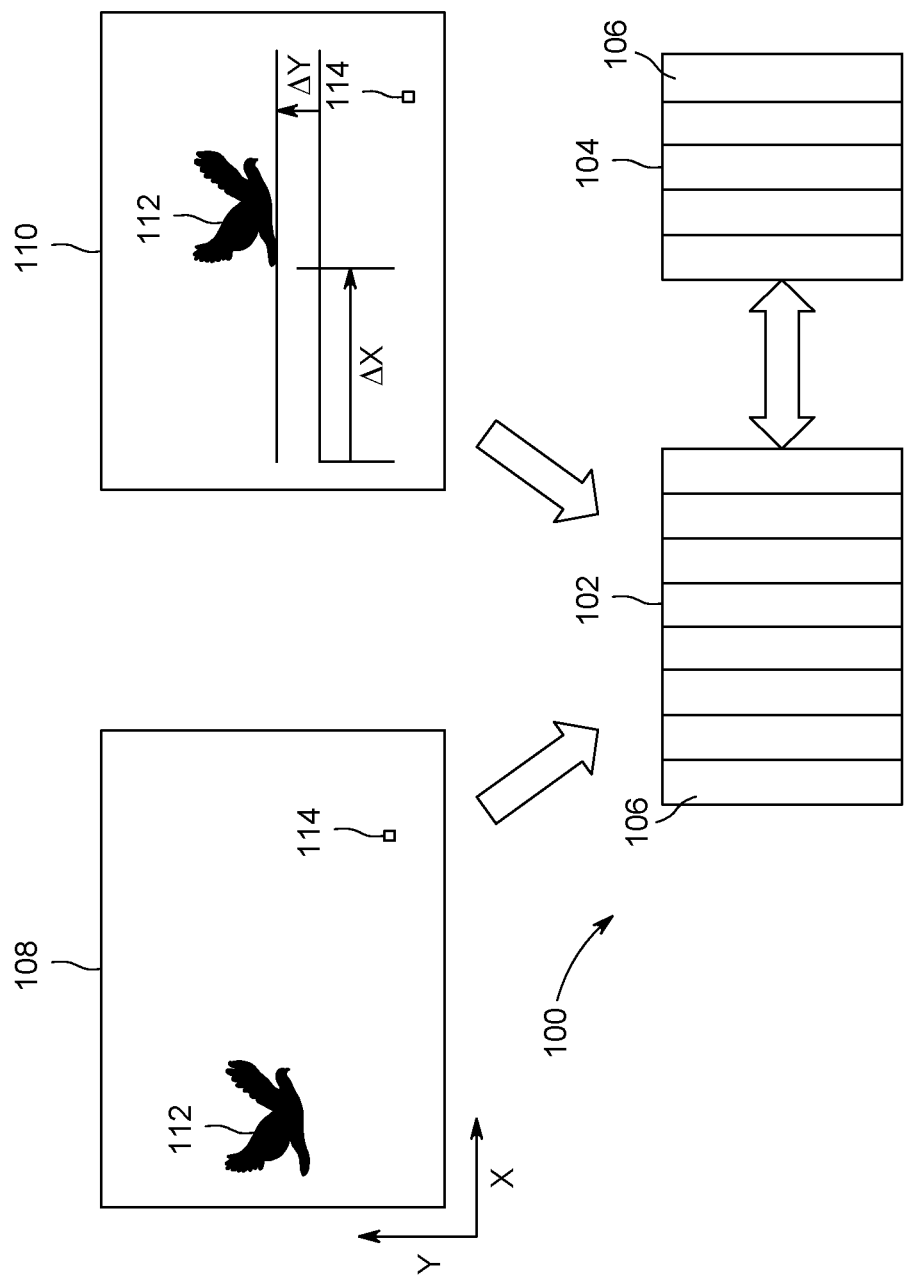
FIG. 1 illustrates one embodiment of an optical flow determination system.
Figure 2:
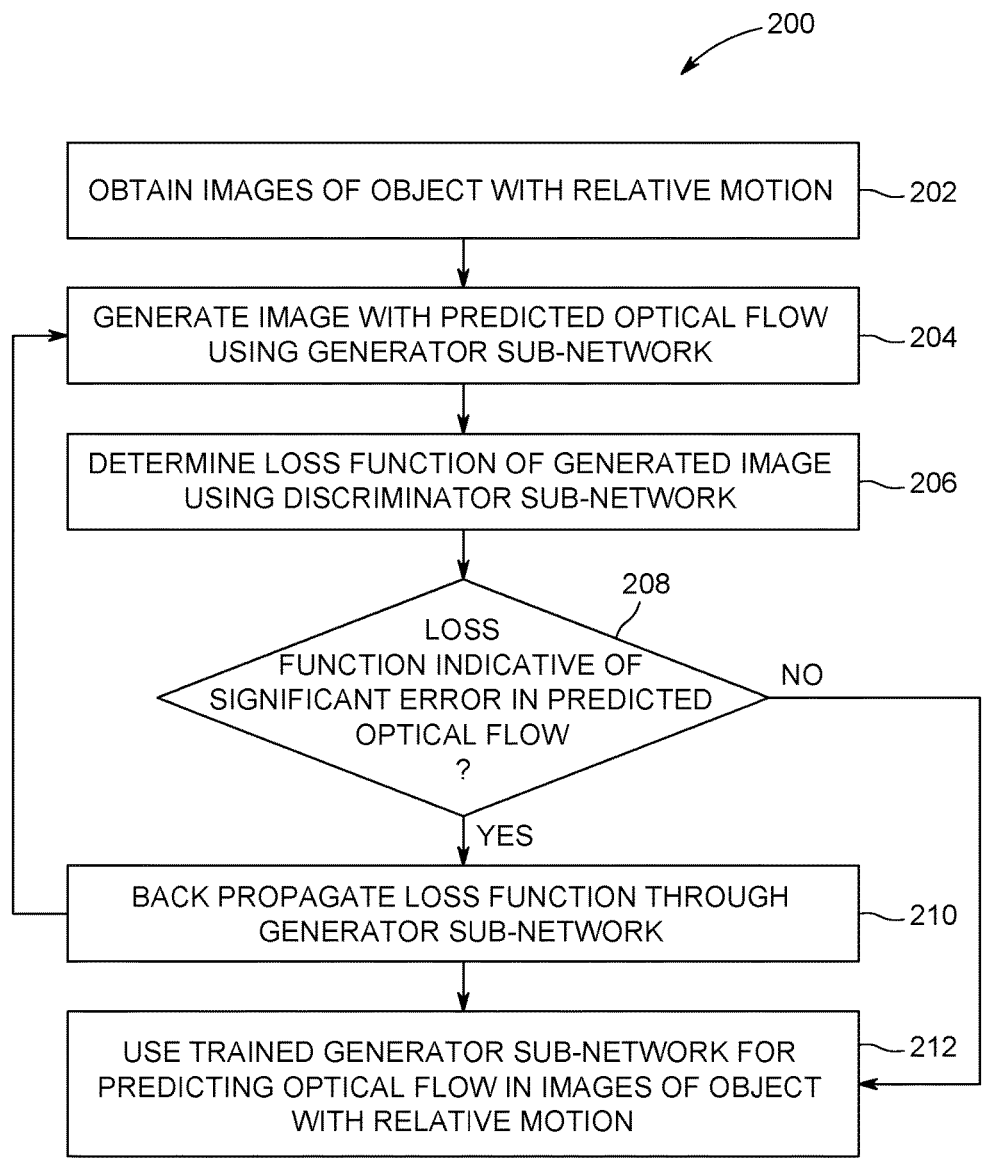
FIG. 2 illustrates a flowchart of one embodiment of a method for determining optical flow in images.

FIG. 1 illustrates one embodiment of an optical flow determination system 100. FIG. 2 illustrates a flowchart of one embodiment of a method 200 for determining optical flow in images. The flowchart of the method 200 can represent operations performed by the system 100 shown in FIG. 1, such as functions performed by one or more processors (e.g., one or more microprocessors, field programmable gate arrays, and/or integrated circuits) under the direction of software, to determine or predict optical flow from images. Optionally, the flowchart of the method 200 can represent an algorithm used to create (e.g., write) such software.

The system 100 includes neural networks 102, 104 and, in one embodiment, represents a GAN system. The neural networks 102, 104 are artificial neural networks formed from one or more processors (e.g., microprocessors, integrated circuits, field programmable gate arrays, or the like). The neural networks 102, 104 are divided into two or more layers 106, such as input layers that receive images, output layers that output an image or loss function (e.g., error, as described below), and one or more intermediate layers. The layers 106 of the neural networks 102, 104 represent different groups or sets of artificial neurons, which can represent different functions performed by the processors on the images to predict optical flow of objects in the images and/or determine errors in the predicted optical flow.

The neural network 102 represents a generator sub-network of a GAN, and the neural network 104 represents a discriminator sub-network of the GAN in one embodiment. In operation, at 202 in the flowchart of the method 200 shown in FIG. 2, the generator sub-network 102 receives images 108, 110 of an object 112 having relative motion. The relative motion includes movement of the object 112 and/or a viewer of the object, such as the camera or other sensor that obtained the images 108, 110. The images 108, 110 can be frames of a video obtained by a camera. The object 112 depicted in the images 108, 110 can be moving relative to the camera (which is stationary), the camera can be moving relative to the object 112 (which is stationary), or both the object 112 and the camera can be moving. For example, a camera can provide frames of a video of a moving person, frames of a video of a stationary object (e.g., the interior of an engine or turbine) while the camera is moving by or within the object, and/or frames of a video of a moving object while the camera also is moving. While the description herein focuses on the generator sub-network 102 obtaining only two images 108, 110, optionally, the generator sub-network 102 can obtain more than two images.

The image 108 is a previous image to the image 110, indicating that the object 112 (a bird in the illustrated example) is moving left to right and upward relative to the camera. The movement of the object 112 can be represented by a displacement Δx along a first (e.g., horizontal) x-axis and a displacement Δy along a second (e.g., vertical) y-axis. This movement represented by Δx and Δy can represent or indicate the optical flow of the object 112 in the images 108, 110. As described herein, the system 100 can operate to predict additional optical flow of the object 112 from the images 108, 110. In one embodiment, the images 108, 110 are not ground truth images, as the images 108, 110 do not explicitly encode the optical flow vectors.

The images 108, 110 can be obtained by the generator sub-network 102 by a camera communicating the images 108, 110 to the generator sub-network 102 via one or more wired and/or wireless connections. Optionally, the images 108, 110 can be stored in a tangible and non-transitory computer readable memory, such as a computer hard drive, optical disk, or the like, and be accessible by the generator sub-network 102 via one or more wired and/or wireless connections.

At 204 in the method 200, an image is created by the generator sub-network 102. The image is created by the generator sub-network 102 based on the images 108, 110 obtained by or otherwise provided to the generator sub-network 102. For example, the processors of the generator sub-network 102 can examine characteristics of the pixels 114 in the images 108, 110. These characteristics can include locations of the pixels 114 in the images 108, 110, intensities of the pixels 114, colors of the pixels 114, edges of the structures in the scene, etc. The generator sub-network 102 can determine statistical distributions (e.g., Gaussian distributions) of the pixel characteristics. Different distributions can be determined for different pixels or locations in the images 108, 110. The generator sub-network 102 can examine the statistical distributions and determine probabilities of each pixel 114 having various characteristics. Based on the distributions and probabilities, the generator sub-network 102 creates one or more distribution-based images that estimate the optical flow between images 108, 110. This multi-channel flow image is used to warp image 110 to obtain an estimate of the image 108. Correct estimation of the optical flow yields to a precise estimation of the image 108.

Figure 3:
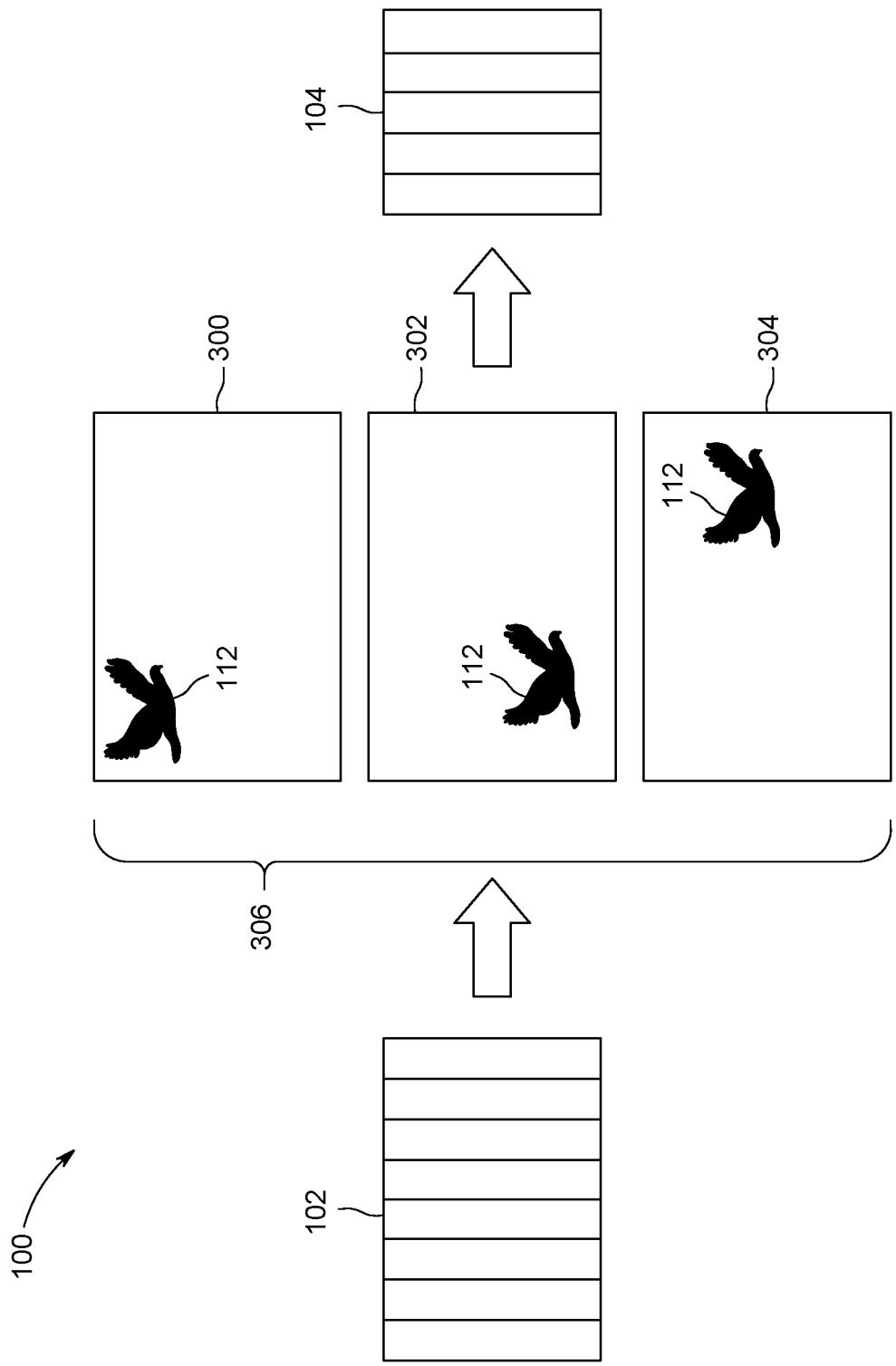
FIG. 3 illustrates a generator sub-network of the optical flow determination system shown in FIG. 1 creating a batch of distribution-based images.

FIG. 3 illustrates the generator sub-network 102 of the system 100 shown in FIG. 1 yielding a batch 306 of distribution-based images 300, 302, 304 after warping. The generator sub-network 102 can yield to multiple distribution-based images 300, 302, 304 based on the characteristics of the images 108, 110 obtained by or otherwise provided to the generator sub-network 102. As shown in FIG. 3, some of the distribution-based images 300, 302, 304 are more likely to represent continuing motion of the object 112 than other distribution-based images 300, 302, 304. For example, the distribution-based image 304 shows the object 112 in a position consistent with the trajectory of the object 112 in the images 108, 110, while the distribution-based images 300, 302 show the object 112 in positions that are inconsistent with this trajectory.

At 206 in the method 200 shown in FIG. 2, loss functions or errors are determined for the distribution-based images (also referred to as generated images) using the discriminator sub-network 104. The generator sub-network 102 can provide the batch of one or more distribution-based images 300, 302, 304 to the discriminator sub-network 104, such as via one or more wired and/or wireless connections between the sub-networks 102, 104.

The discriminator sub-network 104 examines the characteristics of the pixels 114 in the distribution-based images 300, 302, 304 to determine loss functions, or errors, associated with the distribution-based images 300, 302, 304. The loss functions or errors indicate how similar the distribution-based image 300, 302, 304 is to the original image 108 (copies of which also can be provided to the discriminator sub-network 104). In order to achieve this, a pair of real frames (e.g. 108 and 110) and a pair of fake and real frame (e.g. 304 and 110) are fed into the discriminator consecutively during training stage. For example, if the discriminator sub-network 104 determines that the distribution-based image 304 is more like the image 108 than the distribution-based images 300, 302, then the loss function or error attributed to the pair of images 304 and 110 is smaller than the loss function or error attributed to the pairs including distribution-based images 300, 302.

The artificial neurons in the layers 104 of the discriminator sub-network 104 can examine individual pixels 114 in the distribution-based images 300, 302, 304 to decide whether the image pairs (300, 110), (302, 110) and (304, 110) are legitimate consecutive frames. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates a score for the image pair, which can be interpreted as a probability that the input pair is genuine. The neurons in the layers 104 of the discriminator sub-network 104 examine the characteristics of the pixels 114, such as the intensities, colors, structural consistency or the like, to determine the score.

The processors of the discriminator sub-network 104 can then determine the loss function or error for the image pairs (300,110), (302, 110), (304,110) and (108, 110). The discriminator is required to assign 0 probability to the pairs including a fake image (i.e. an image indirectly produced by the generator) and it is required to assign probability 1 to the genuine pair, i.e. the pair (108,110). The loss function or error can be calculated as the mismatch between the required and the assigned probability.

At 208 in the method 200, a determination is made as to whether the loss functions associated with the distribution-based images 300, 302, 304 indicate significant errors in the predicted optical flow of the object 112. For example, the loss functions can be examined, compared to each other, compared to thresholds, or the like, to determine which, if any, of the distribution-based images 300, 302, 304 is similar to the original images 108, 110. The discriminator sub-network 104 can determine that a distribution-based image is not similar to the images 108 responsive to the loss functions associated with the distribution-based image indicating larger error (e.g., relative to a designated threshold). The discriminator sub-network 104 can determine that a distribution-based image is similar to the images 108 responsive to the loss functions associated with the distribution-based image indicating smaller error (e.g., relative to a designated threshold).

If the discriminator sub-network 104 determines that a distribution-based image 300, 302, or 304 is similar to the original image 108 (e.g., the error is not significant), then the location and/or appearance of the object 112 in the distribution-based image 300, 302, or 304 is an indicator of the accurate prediction of the optical flow of the object 112 through the images 108, 110 and 300, 302, or 304. As a result, flow of the method 200 can proceed toward 212. But, if the discriminator sub-network 104 determines that a distribution-based image 300, 302, or 304 is not similar to the original image 108 (e.g., the error is significant), then the location and/or appearance of the object 112 in the distribution-based image 300, 302, or 304 is not an accurate prediction of the optical flow of the object 112 through the images 108, 110 and 300, 302, or 304. As a result, flow of the method 200 can proceed toward 210.

At 210, the loss function(s) associated with the significant error are back-propagated through the discriminator sub-network 104 and/or the generator sub-network 102. The backpropagation through discriminator, and the backpropagation through the discriminator and the generator is done in an alternating fashion. When backpropagating through the discriminator only, the weights of the discriminator is updated in such a way that the discriminator assigns correct probabilities to the genuine and fake pairs. When backpropagating through the generator and the discriminator, the coefficients of the discriminator are kept constant and the weights of the generator are updated in such a way that the flow produced by the generator yields more genuine-looking pairs. The processors of the generator sub-network 102 back-propagate the errors back through the layers 106 of the generator sub-network 102 to train or improve the training of the generator sub-network 102. For example, for the pixel 114 in the preceding example, the loss function of [0.4 −0.15 −0.05 −0.2] can be back-propagated through the generator sub-network 102. The loss functions for the other pixels 114 in the same image also can be back-propagated through the layers 106 of the generator sub-network 102.

During forward propagation of image data through layers 106 of a neural network 102, 104, the application of functions to characteristics of a pixel 114 by the neurons in a layer 106 is based on the results of the functions applied by the neurons in the preceding layers 10 in the neural network 102. During back-propagation, this process is repeated in the reverse order. The loss functions for the pixels 114 are examined by the neurons in the last layer 104 of the generator sub-network 102 first (e.g., the functions are applied by the neurons to the pixels 114), followed by the neurons in the second-to-last layer 106, followed by the neurons in the third-to-last layer 106, and so on.

Back propagation of the loss functions in the generator sub-network 102 trains the sub-network 102 to create distribution-based images that more accurately reflect or predict optical flow of the object 112 in the images 108, 110. Training a deep learning model can involve this back-propagation process, which helps the sub-network 102 to learn from mistakes in identifying objects in images and obtain better representations of the flow of objects in the images. In one embodiment, this back-propagation process can be modified by changing the weights or weight values applied by neurons in the generator sub-network 102 to those pixels 114 having greater errors. This causes the generator sub-network 102 to be tuned to reduce further errors by focusing on those errors more during subsequent examination of images 108, 110.

Flow of the method 200 can return toward 204 following back propagation of the loss functions through the generator sub-network 102. The method 200 can proceed by the generator sub-network 102 creating distribution-based images, the discriminator sub-network 104 determining whether the errors in the distribution-based images are small enough that the distribution-based image(s) accurately reflects or is confused with the original images 108, 110, and the generator sub-network 102 back propagating the loss functions until the generator sub-network 102 is able to create distribution-based images that fool or trick the discriminator sub-network 104 into determining that the distribution-based images are additional images of the motion of the object 112.

If the loss functions are sufficiently low at 208 that the discriminator sub-network 104 determines that the distribution-based images are additional images of the motion of the object 112, then the generator sub-network 102 predicts optical flow of the object 112 by generating one or more additional distribution-based images. For example, once the method 200 trains the generator sub-network 102 to accurately generate images that the discriminator sub-network 104 determines are additional, actual images of movement of the object 112, the generator sub-network 102 can be used to generate distribution-based images that predict motion of the object 112 not only for the pair of images which appeared in the training set, but also for other pair of consecutive frames which were unknown to the generator network during training.

These distribution-based images can be used for a variety of end uses. As one example, the distribution-based images can be used to generate a 3D point cloud. The 3D point cloud can then be used to allow a user to interact with a 3D representation of an object. For example, a small camera can be inserted into the interior of a turbine engine with several images 108, 110 of interior surfaces of the engine acquired while the camera is moving in the engine. These images 108, 110 can then be used to create additional images indicative of predicted optical flow of the interior surfaces (or features in the interior surfaces, such as damaged portions of the engine). The created and/or original images can be used to create a 3D point cloud that then is used to create a virtual reality environment of the interior of the engine. Such an environment can allow users to closely examine accurate representations of the interior of small spaces (e.g., engines) to check for damage (e.g., corrosion, spalling, etc.).

Figure 4:
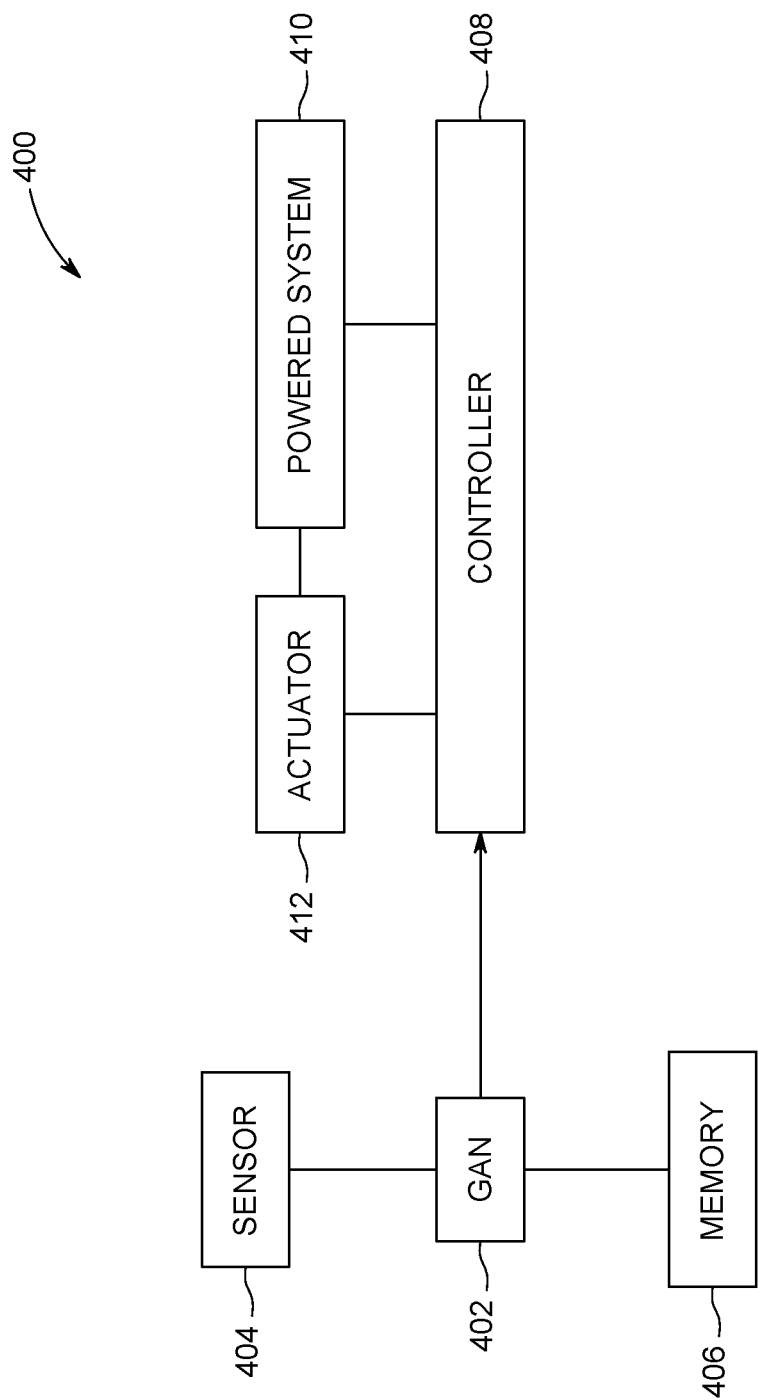
FIG. 4 illustrates one example of a control system that uses predicted optical flow as determined by a GAN system.

FIG. 4 illustrates one example of a control system 400 that uses predicted optical flow as determined by a GAN system 402. The GAN system 402 represents one or more embodiments of the system 100 described above. The control system 400 includes a sensor 404 that obtains images 108, 110 for the GAN system 402. For example, the sensor 404 can be a camera that provides images or video frames to the GAN system 402 as the images 108, 110. Optionally, the control system 400 includes a memory 406, such as a computer hard drive, optical disc, or the like, that stores the images 108, 110 for the GAN system 402.

The GAN system 402 can predict optical flow of an object 112 as described above. The predicted optical flow (e.g., in the form of images predicting upcoming movement of the object 112) can be communicated to a controller 408 of a powered system 410. The controller 408 represents hardware circuitry that includes and/or is connected with one or more processors (e.g., one or more microprocessors, field programmable gate arrays, integrated circuits, etc.). The controller 408 controls operation of the powered system 410, which can represent an automobile, rail vehicle, airplane, generator, or the like. The controller 408 can examine the predicted optical flow and determine whether one or more responsive actions need to be implemented. For example, if the predicted optical flow indicates that an object 112 is moving toward a collision with a vehicle, then the controller 408 can generate and communication a control signal to an actuator 412 that changes operation of the powered system 410. The actuator 412 can include a brake system, throttle, steering wheel, or the like, that is actuated to change movement of the powered system 410 (and avoid collision with the object 112). The responsive action can be applying the brakes, changing a direction in which the vehicle is moving, and/or changing a speed at which the vehicle is traveling. Another example of a responsive action can be generating a 3D point cloud of equipment for visual inspection of the equipment.

In one embodiment, a generative adversarial network (GAN) system includes a generator sub-network configured to examine images of an object moving relative to a viewer of the object. The generator sub-network also is configured to generate one or more distribution-based images based on the images that were examined. The system also includes a discriminator sub-network configured to examine the one or more distribution-based images to determine whether the one or more distribution-based images accurately represent the object. A predicted optical flow of the object is represented by relative movement of the object as shown in the one or more distribution-based images.

In one example, the discriminator sub-network is configured to determine one or more loss functions indicative of errors in the predicted optical flow of the object in the one or more distribution-based images.

In one example, the generator sub-network is configured to be trained using the one or more loss functions.

In one example, the generator sub-network is configured to be trained using the one or more loss functions by back-propagating the one or more loss functions through the generator sub-network.

In one example, the generator sub-network is configured to generate one or more additional distribution-based images to represent the predicted optical flow of the object.

In one example, the generator sub-network is configured to generate the one or more distribution-based images based on one or more distributions of pixel characteristics in the images that were examined by the generator sub-network.

In one example, the system also includes a controller configured to implement one or more actions responsive to determining the predicted optical flow of the object.

In one example, the viewer of the object is a camera that obtains the images of the object.

In one embodiment, a method includes examining images of an object moving relative to a viewer of the object using a generator sub-network of a generative adversarial network (GAN) system, generating one or more distribution-based images using the generator sub-network based on the images that were examined by the generator sub-network, examining the one or more distribution-based images using a discriminator sub-network of the GAN system to determine whether the one or more distribution-based images accurately represent the object, determining a predicted optical flow of the object based on the one or more distribution-based images responsive to determining that the one or more distribution-based images accurately represent the object using the discriminator sub-network.

In one example, the method also includes determining one or more loss functions indicative of errors in the predicted optical flow of the object in the one or more distribution-based images using the discriminator sub-network.

In one example, the method also includes training the generator sub-network using the one or more loss functions.

In one example, training the generator sub-network using the one or more loss functions includes back-propagating the one or more loss functions through the generator sub-network.

In one example, the method also includes generating one or more additional distribution-based images using the generator sub-network to represent the predicted optical flow of the object.

In one example, the one or more distribution-based images are generated based on one or more distributions of pixel characteristics in the images that were examined by the generator sub-network.

In one example, the method also includes implementing one or more actions responsive to determining the predicted optical flow of the object.

In one example, the viewer of the object is a camera that obtains the images of the object.

In one embodiment, a system includes a generator sub-network configured to examine images of a moving object. The generator sub-network also is configured to generate one or more distribution-based images based on distributions of pixel characteristics in the images. The system also includes a discriminator sub-network configured to examine the one or more distribution-based images to determine one or more errors between the one or more distribution-based images and the images of the moving object. The one or more errors are indicative of whether the one or more distribution-based images accurately represent the moving object. A predicted optical flow of the object is represented by relative movement of the object as shown in the one or more distribution-based images.

In one example, the generator sub-network is configured to be trained using the one or more errors.

In one example, the generator sub-network is configured to generate one or more additional distribution-based images to represent the predicted optical flow of the moving object following training of the generator sub-network using the one or more errors.

In one example, the system also includes a controller configured to implement one or more actions responsive to determining the predicted optical flow of the object.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A generative adversarial network (GAN) system comprising:
   a generator sub-network configured to examine camera-based images of interior surfaces of equipment that are moving relative to a camera that generated the images, the generator sub-network also configured to generate one or more distribution-based images based on the camera-based images that were examined;
   a discriminator sub-network configured to examine the one or more distribution-based images to determine whether the one or more distribution-based images accurately represent the interior surfaces of the equipment,
   wherein a predicted optical flow of the interior surfaces is represented by relative movement of the interior surfaces as shown in the one or more distribution-based images; and
   one or more processors configured to generate a three-dimensional (3D) point cloud using the predicted optical flow of the interior surfaces, the 3D point cloud depicting an interior of the equipment.

2. The system of claim 1, wherein the discriminator sub-network is configured to determine one or more loss functions indicative of errors in the predicted optical flow of the interior surfaces in the one or more distribution-based images.

3. The system of claim 2, wherein the generator sub-network is configured to be trained using the one or more loss functions.

4. The system of claim 3, wherein the generator sub-network is configured to be trained using the one or more loss functions by alternating back-propagating the one or more loss functions through the generator sub-network and back-propagating the one or more loss functions through the discriminator sub-network, wherein coefficients of the one or more loss functions are kept constant during back-propagating of the one or more loss functions through the discriminator sub-network.

5. The system of claim 3, wherein the generator sub-network is configured to generate one or more additional distribution-based images to represent the predicted optical flow of the interior surfaces of the equipment.

6. The system of claim 1, wherein the generator sub-network is configured to generate the one or more distribution-based images based on one or more distributions of pixel characteristics in the camera-based images that were examined by the generator sub-network.

7. The system of claim 1, wherein the camera-based images are obtained from the camera that is inserted into the equipment.

8. A method comprising:
   examining camera-based images of interior surfaces of equipment that are moving relative to a camera that generated the camera-based images using a generator sub-network of a generative adversarial network (GAN) system;

generating one or more distribution-based images using the generator sub-network based on the camera-based images that were examined by the generator sub-network;

examining the one or more distribution-based images using a discriminator sub-network of the GAN system to determine whether the one or more distribution-based images accurately represent the interior surfaces of the equipment;

responsive to determining that the one or more distribution-based images accurately represent the interior surfaces of the equipment using the discriminator sub-network, determining a predicted optical flow of the interior surfaces of the equipment abased on the one or more distribution-based images; and generating a three-dimensional (3D) point cloud using the predicted optical flow of the interior surfaces, the 3D point cloud depicting an interior of the equipment.

9. The method of claim 8, further comprising determining one or more loss functions indicative of errors in the predicted optical flow of the interior surfaces of the equipment in the one or more distribution-based images using the discriminator sub-network.

10. The method of claim 9, further comprising training the generator sub-network using the one or more loss functions.

11. The method of claim 10, wherein training the generator sub-network using the one or more loss functions includes alternating between back-propagating the one or more loss functions through the generator sub-network and back-propagating the one or more loss functions through the discriminator sub-network, wherein coefficients of the one or more loss functions are kept constant during back-propagating of the one or more loss functions through the discriminator sub-network.

12. The method of claim 9, further comprising generating one or more additional distribution-based images using the generator sub-network to represent the predicted optical flow of the interior surfaces of the equipment.

13. The method of claim 8, wherein the one or more distribution-based images are generated based on one or more distributions of pixel characteristics in the camera-based images that were examined by the generator sub-network.

14. The method of claim 8, further comprising:
obtaining the camera-based images by inserting the camera into the interior of the equipment.

15. A system comprising:
a generator sub-network configured to examine camera-based images of a moving object, the generator sub-network also configured to generate one or more distribution-based images based on distributions of pixel characteristics in the camera-based images;

a discriminator sub-network configured to examine the one or more distribution-based images to determine one or more errors between the one or more distribution-based images and the camera-based images of the moving object, the one or more errors indicative of whether the one or more distribution-based images accurately represent the moving object, wherein a predicted optical flow of the moving object is represented by relative movement of the object as shown in the one or more distribution-based images; and one or more processors configured to generate a three-dimensional (3D) point cloud representative of the moving object, the 3D point cloud generated using the predicted optical flow of the moving object.

16. The system of claim 15, wherein the generator sub-network is configured to be trained using the one or more errors.

17. The system of claim 16, wherein the generator sub-network is configured to generate one or more additional distribution-based images to represent the predicted optical flow of the moving object following training of the generator sub-network using the one or more errors.

18. The system of claim 15, wherein the one or more processors also are configured to change movement of a vehicle responsive to determining the predicted optical flow of the moving object.

* * * * *